United States Patent
Haupt et al.

(10) Patent No.: US 11,454,288 B2
(45) Date of Patent: Sep. 27, 2022

(54) ACTUATOR ASSEMBLY FOR CLUTCH ASSEMBLY FOR VEHICLE POWER TRAIN

(71) Applicant: GKN Automotive Limited, Birmingham (GB)

(72) Inventors: Jan Haupt, Kürten (DE); Thomas Weckerling, Sankt Augustin (DE); Theodor Gassmann, Siegburg (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/419,875

(22) PCT Filed: Jan. 11, 2019

(86) PCT No.: PCT/EP2019/050689
§ 371 (c)(1),
(2) Date: Jun. 30, 2021

(87) PCT Pub. No.: WO2020/143921
PCT Pub. Date: Jul. 16, 2020

(65) Prior Publication Data
US 2022/0082137 A1   Mar. 17, 2022

(51) Int. Cl.
*F16D 23/12* (2006.01)
*F16D 13/52* (2006.01)
(Continued)

(52) U.S. Cl.
CPC ............. *F16D 23/12* (2013.01); *F16D 13/52* (2013.01); *F16D 21/00* (2013.01); *F16D 23/14* (2013.01);
(Continued)

(58) Field of Classification Search
CPC .. F16D 2023/123; F16D 13/52; F16H 37/082; F16H 2200/0021; F16H 2200/0034; F16H 2200/2005; F16H 2200/2035
See application file for complete search history.

(56) References Cited

U.S. PATENT DOCUMENTS 6,851,534 B2 *  2/2005  Hock .................... F16H 25/186
                                                                    192/48.2
2018/0073572 A1 *  3/2018  Lien ........................ F16D 21/00
(Continued)

FOREIGN PATENT DOCUMENTS

| DE | 102005022926 B3 | 2/2007 |
| DE | 102008063904 A1 | 7/2010 |

(Continued)

OTHER PUBLICATIONS

International Search Report and Written Opinion for PCT/EP2019/050689 dated Sep. 16, 2019 (11 pages; with English translation).

*Primary Examiner* — Stacey A Fluhart
(74) *Attorney, Agent, or Firm* — Bejin Bieneman PLC

(57) ABSTRACT

An actuator assembly comprises a rotatably drivable drive gear; a locking ring which is rotatably mounted in a stationary housing and is drivingly connected to the drive gear, wherein the locking ring is rotatable from a first rotational position into a second rotational position against a rotation stop; wherein at least one friction face pairing is provided in the power path between the drive gear and the locking ring, via which a torque can be transmitted to the locking ring by frictional forces; a first ramp ring drivable by the drive gear and a second ramp ring, which are axially supported against each other and are configured to convert rotary movement into axial movement; wherein the first ramp ring, after the locking ring has reached the rotary stop, can be further rotatably driven by the drive gear.

16 Claims, 6 Drawing Sheets

(51) Int. Cl.
  *F16D 21/00* (2006.01)
  *F16D 23/14* (2006.01)
  *F16H 37/08* (2006.01)
  *B60K 1/00* (2006.01)

(52) U.S. Cl.
  CPC ...... *F16H 37/082* (2013.01); *B60K 2001/001* (2013.01); *F16D 2023/123* (2013.01); *F16H 2200/0021* (2013.01); *F16H 2200/0034* (2013.01); *F16H 2200/2005* (2013.01); *F16H 2200/2035* (2013.01); *F16H 2200/2064* (2013.01); *F16H 2200/2094* (2013.01); *F16H 2702/02* (2013.01)

(56) References Cited

U.S. PATENT DOCUMENTS

2019/0257375 A1\* 8/2019 Iwano .................. F16D 41/064
2020/0049211 A1\* 2/2020 Hamrin ................ F16D 41/069

FOREIGN PATENT DOCUMENTS

| DE | 102018124681 A1 | 5/2019 |
| WO | 2010078937 A1 | 7/2010 |
| WO | 2015120909 A1 | 8/2015 |
| WO | 2017125135 A1 | 7/2017 |
| WO | 2018014950 A1 | 1/2018 |

\* cited by examiner

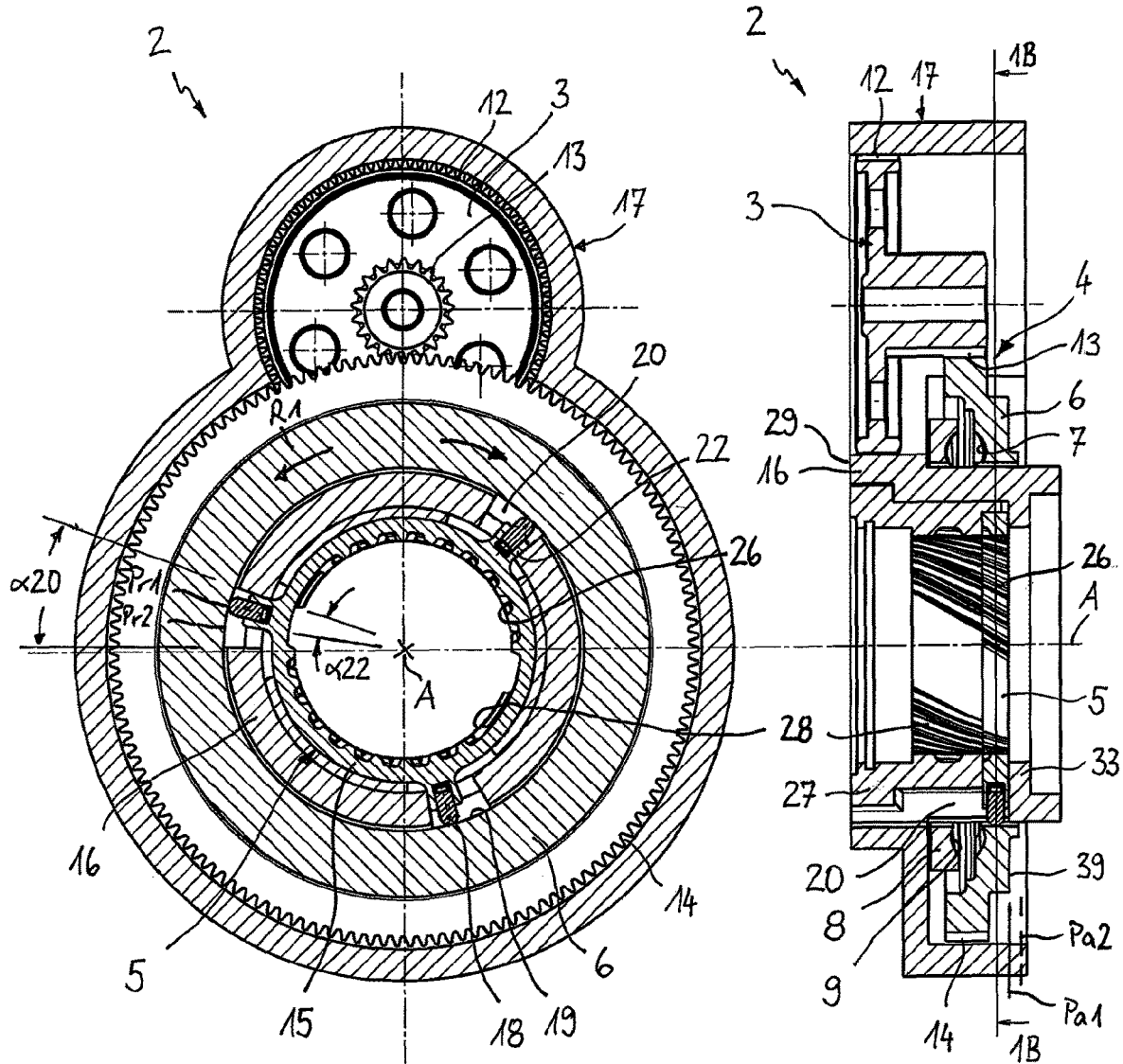
Fig. 1B
Fig. 1A
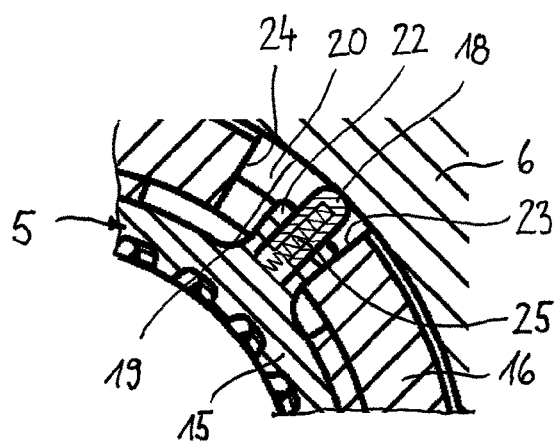
Fig. 1C

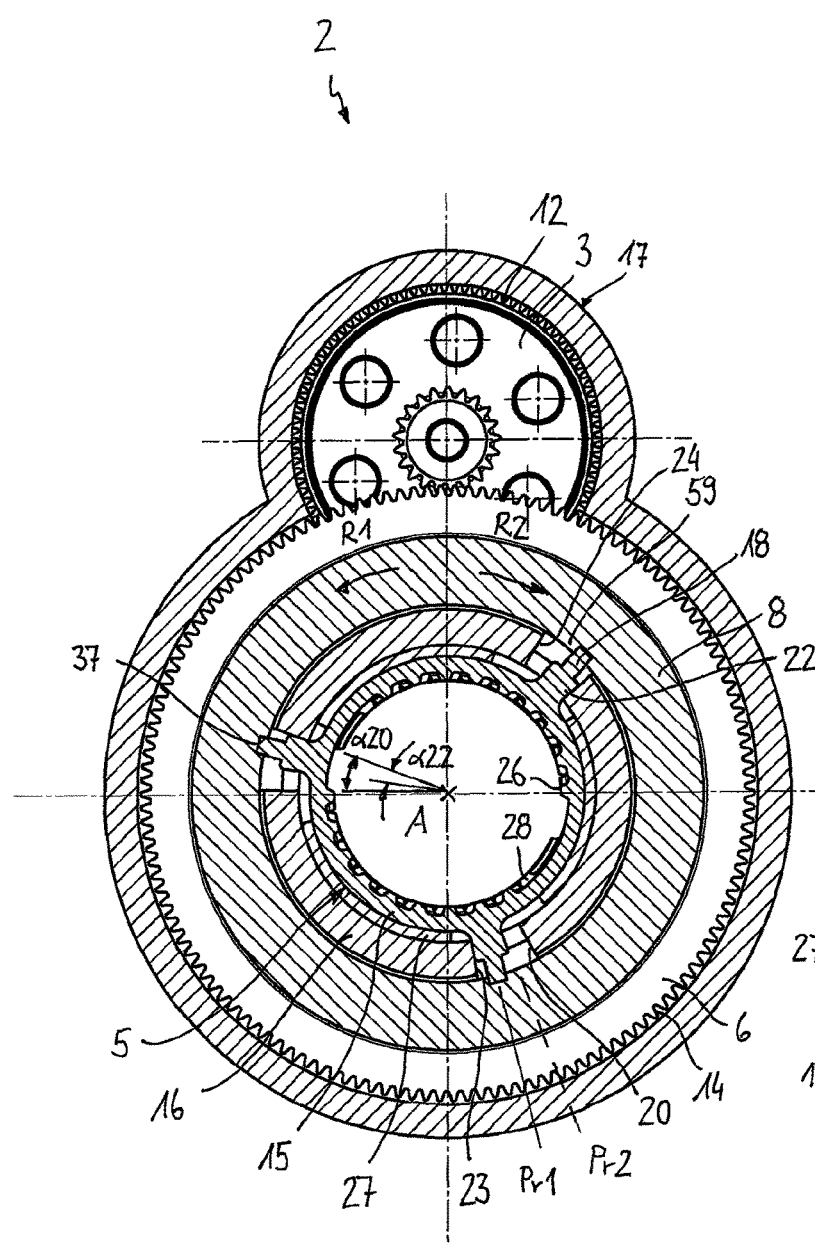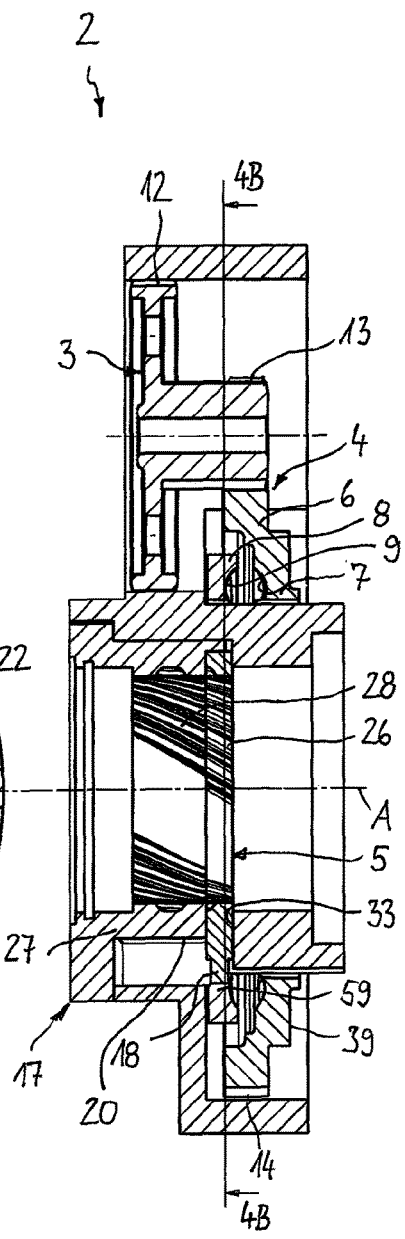
Fig. 4BFig. 4A

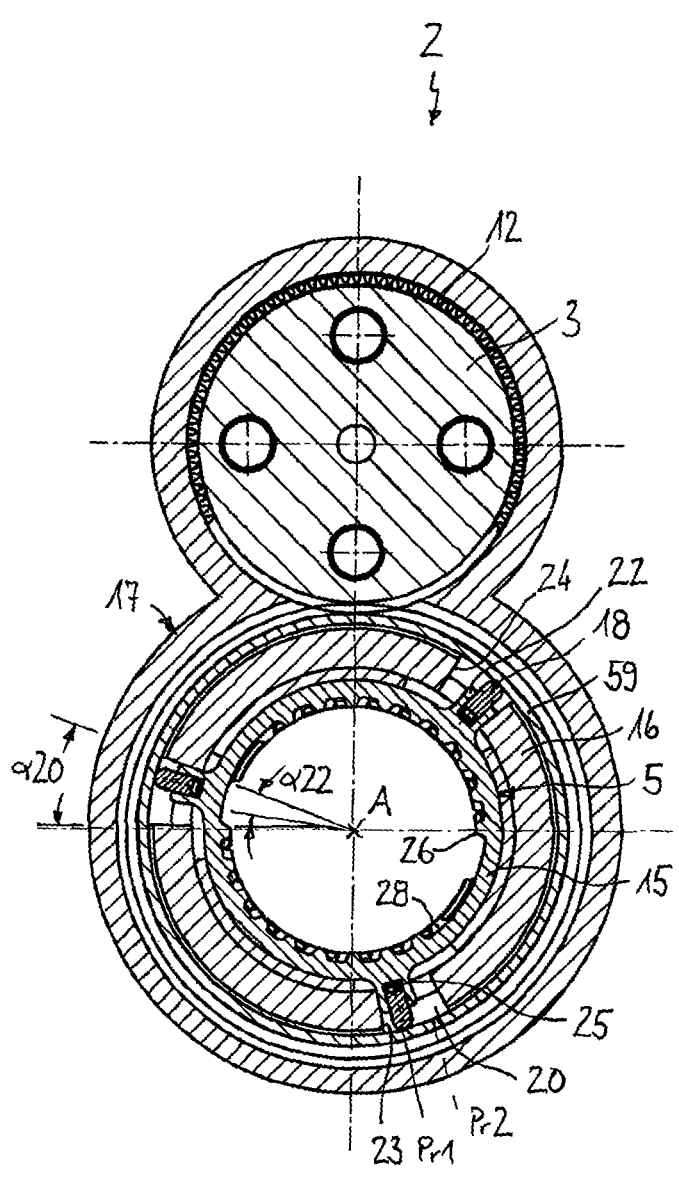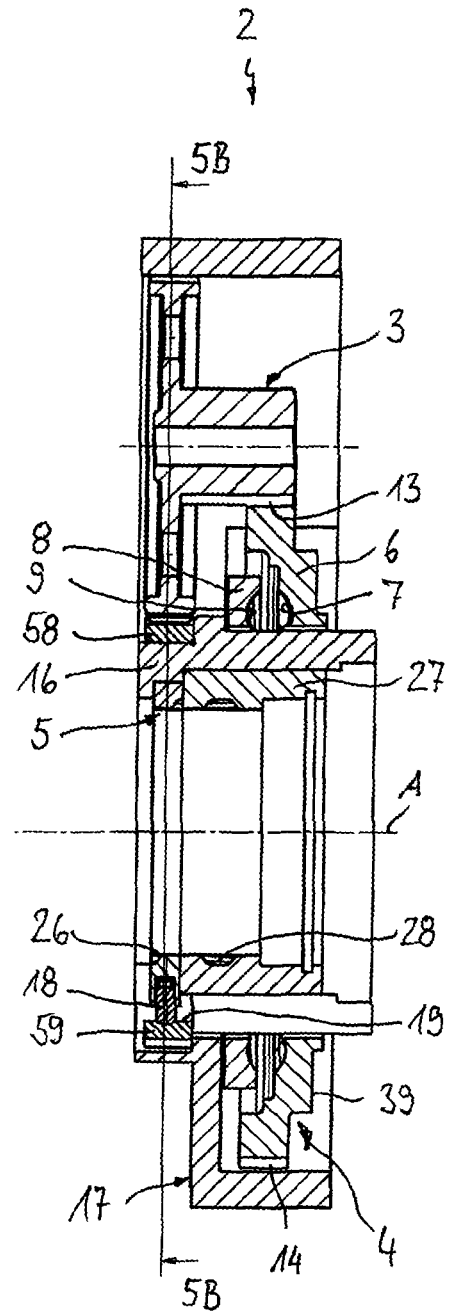
Fig. 5B
Fig. 5A

ACTUATOR ASSEMBLY FOR CLUTCH ASSEMBLY FOR VEHICLE POWER TRAIN

CROSS-REFERENCE TO RELATED APPLICATIONS

This application is a national stage of, and as such claims priority to, Patent Cooperation Treaty Application No. PCT/EP2019/050689, filed on Jan. 11, 2019, which application is hereby incorporated herein by reference in its entirety.

BACKGROUND

In general, actuators are used for a variety of functional units in drivelines of motor vehicles. For example, actuators are known for clutches that are used in drivelines of motor vehicles to selectively establish, interrupt or set a torque transmission to a desired value.

Multi-axle drive vehicles with a first driveline for permanently driving a first drive axle and a second driveline for optionally driving a second drive axle are known. Different drive concepts are distinguished, for example motor vehicles with a front engine in which the front axle is permanently driven and the rear axle is drivingly connectable. There are also motor vehicles with a front engine in which the rear axle is permanently driven and the front axle is drivingly connectable. Finally, motor vehicles with a rear engine are known in which the rear axle is permanently driven and the front axle is drivingly connectable as required. The selectable drivable drive axle can be driven by an electric motor, for example.

From DE 10 2008 063 904 A1, corresponding to WO2010/078937 A1, a drive arrangement for a multi-axle driven motor vehicle is known. The drive arrangement comprises a differential unit, a controllable hang-on clutch for being drivingly connected to a drive unit, and a locking clutch in inhibit the compensating movement of the differential. The two clutches are arranged coaxially relative to each other and can be actuated by a ball ramp assembly. According to an embodiment, it is provided that the locking clutch is actuated first and then the hang-on clutch. According to another embodiment, the hang-on clutch is actuated first, followed by the locking clutch.

Actuators for parking locks are known which are used in drivelines of motor vehicles to optionally lock a drive component in the driveline so that the motor vehicle is prevented from unintentionally rolling away when the drive source does not provide torque.

DE 10 2005 022 926 B3 describes a drive unit for a motor vehicle with an electric motor, a multi-step transmission with at least two gear steps and a differential. To actuate the two gear steps, an actuator assembly is provided which has a rotatably drivable shift drum. By means of the shift drum, a shift sleeve is actuated, which actuates a first shift clutch or alternatively a second shift clutch. A parking lock device is also provided, which is arranged coaxially with the motor shaft. The parking lock device has a locking sleeve which is mounted so as to be axially movable between a release position and a locking position. The locking sleeve is actuatable by the same actuator assembly as the clutches.

SUMMARY

The present disclosure relates to an actuator assembly for a driveline of a motor vehicle. The disclosure further relates to a clutch arrangement comprising such an actuator assembly, and to a corresponding drive arrangement for driving a motor vehicle comprising such an actuator assembly. The multi-functional actuator assembly is designed in a simple and space-saving manner. A clutch arrangement and/or drive arrangement can include such an actuator assembly.

An actuator assembly for a clutch arrangement in the driveline of a motor vehicle is described, comprising: a rotatably drivable drive gear; a locking ring which is supported in a stationary housing so as to be rotatable about an axis of rotation and which is drivingly connected to the drive gear via a power path, wherein the locking ring is rotatable by the drive gear from a first rotational position into a second rotational position against a rotation stop; wherein at least one friction face pairing is provided in the power path between the drive gear and the locking ring, via which friction face pairing a torque is transmittable to the locking ring by means of frictional forces; a first ramp ring which is rotatably drivable by the drive gear and a second ramp ring, wherein the first ramp ring and the second ramp ring are axially supported against each other and are configured to convert a relative rotational movement into an axial movement; wherein the ramp ring, after the locking ring has reached the rotation stop, is further rotatably drivable by the drive gear.

An advantage is that the actuator assembly can realize two functions, namely actuating the locking ring, for example for a overrunning clutch, and actuating a further setting member, for example for a friction clutch. Thus, the proposed actuator assembly requires only a small number of components, which has a favorable effect on the required installation space and the manufacturing and assembly costs. Furthermore, in addition to the mechanical integration of a first and a second actuating function, an electrical integration is also achieved accordingly, which also has a favorable effect on the reliability and service life of the arrangement due to a lower number of electrical interfaces.

According to an embodiment, the locking ring may have a ring portion and at least one connecting element projecting therefrom for introducing a torque into the locking ring. With the ring portion, the locking ring can be mounted in the stationary housing for limited rotation. One, two, three or more connecting elements may be provided, which can be distributed uniformly over the circumference and may project radially outwards from the ring portion. It will be understood that where reference is made herein to one or at least one connecting portion, the features described may also apply to any further connecting portion.

The stationary housing can have a sleeve-shaped portion in which the locking ring is rotatably supported about the axis of rotation, the sleeve-shaped portion having at least one radial through-opening in which the at least one connecting element of the locking ring engages. Preferably, one through-opening is provided for each connecting element.

According to a first embodiment of the locking element, the at least one connecting element is spring-loaded against an actuating ring and is in frictional contact therewith, which actuating ring being rotatably drivable by the drive gear. The actuating ring can be rotated relative to the locking ring, wherein by rotating the actuating ring, the locking ring is carried along due to the frictional effect until the locking ring comes to rest against a rotation stop. After the locking ring has stopped rotating, the actuating ring continues to rotate, with the at least one connecting element sliding along the contact face of the actuating ring. In a further specification, the at least one connecting element can be resiliently supported against a base body of the locking ring via a spring element. The base body of the locking ring is annular in shape and preferably has a plurality of radial bores distributed over the circumference, in each of which a connecting element is resiliently received. A connecting element and associated spring element can be designed as separate elements, although it is also possible for these to be firmly connected to each other and/or designed in one piece.

The actuating ring, with which the locking ring is in frictional contact via the connecting elements, can in principle be any component in the power path between the drive gear and the locking ring. According to a first option, the actuating ring can be connected in a rotationally fixed manner to, e.g., in one piece with, the rotationally drivable first ramp ring. In this case, the friction face pairing for rotatably driving the locking ring is formed respectively between a contact face of a connecting element and a support face of the first ramp ring. According to a second option, the actuating ring can be designed in the form of an intermediate gear which is rotatably drivable about the axis of rotation by the drive gear. In this case, the friction face pairing is formed respectively between a contact face of a connecting element and a support face of the intermediate gear. In this embodiment, the drive gear can have a first set of teeth for driving the first ramp ring and a second set of teeth for driving the intermediate gear, the two sets of teeth having a different diameter and/or a different number of teeth.

According to a second embodiment, the locking element can be connected to the second ramp ring in a rotationally fixed manner via the at least one connecting element, so that both rotate together. In this case, the friction face pairing is formed in the power path between the rotatably drivable first ramp ring and the second ramp ring. When the first ramp ring is rotated by the drive gear, the second ramp ring and the locking ring connected thereto in a rotationally fixed manner initially rotate therewith until the locking ring strikes against a rotation stop of the stationary housing. After this rotational stop of the locking ring and the second ramp ring connected thereto, the first ramp ring continues to rotate with respect thereto, wherein the rotational movement of the first ramp ring relative to the second ramp ring results in an axial expansion of the ball ramp arrangement.

For all of the above embodiments, the first ramp ring and the second ramp ring are axially supported against each other indirectly via balls which run in respective ball grooves of the first and second ramp rings. The ball grooves can be designed in such a way that they each have a decreasing depth in the same circumferential direction in plan view onto the end faces, wherein pairs of opposing ball grooves each receive a ball via which the first and second rings are supported against each other. Upon relative rotation of one ramp ring relative to the other ramp ring, the balls migrate into deeper or shallower groove regions, depending on the direction of rotation, so that the two ramp rings either move axially closer or away from each other. As an alternative to the configuration with ball grooves, the first ramp ring and the second ramp ring can also be axially supported directly against each other via respective sliding faces.

According to a possible embodiment, the second ramp ring is axially supported against the stationary housing, wherein the first ramp ring is movable by being rotatably driven by means of the drive gear from a first axial position, in which the first ramp ring is axially close to the second ramp ring, into a second axial position, in which the first ramp ring is axially spaced from the second ramp ring. The first ramp ring can have an actuating face on its side facing away from the second ramp ring for axially loading a friction clutch.

Further, a clutch arrangement with an actuator assembly, which is designed according to at least one of the above-mentioned embodiments, comprises: an interlocking clutch having a first clutch element and a second clutch element axially movable relative thereto, wherein the second clutch element in a closed position is connected to the first clutch element in a rotationally fixed manner and in an open position is decoupled from the first clutch element to be freely rotatable relative thereto; a friction clutch for variable torque transmission between a first clutch part and a second clutch part; wherein the locking ring of the actuator assembly, in the first rotational position, blocks axial movement of the second clutch element of the interlocking clutch, wherein the interlocking clutch is closed; wherein the locking ring, by being rotated into the second rotational position by means of the drive gear, releases the second clutch element of the interlocking clutch axially so that the interlocking clutch is opened; wherein upon further rotation of the drive gear, the locking ring remains in the second rotational position and the friction clutch is loaded in the closing direction by the rotationally drivable first ramp ring.

According to an embodiment, the first clutch element of the interlocking clutch can be supported against rotation and axially movable in the stationary housing. Axial adjustment of the first clutch element removes the blocking of the locking ring so that the two clutch elements can rotate freely relative to each other. In this respect, the first clutch element of the interlocking clutch can also be referred to as a setting element or blocking element, and the interlocking clutch can also be referred to as a overrunning clutch. The second clutch element of the interlocking clutch can be connected to a shaft in a rotationally fixed and axially fixed manner.

The friction clutch can have first disks connected to the first friction clutch part in a rotationally fixed and axially movable manner, and second disks connected to the second friction clutch part in a rotationally fixed and axially movable manner, wherein the first and second disks are arranged axially alternately and jointly form a disk pack. The disk pack is axially loadable by a pressure plate which can be actuated by the first ramp ring, with an axial bearing being provided between the first ramp ring and the pressure plate for rotational decoupling.

According to an embodiment, an epicyclic gear transmission can be provided with a transmission input part and having an input gear which is rotatably drivable about an axis of rotation (A) by the electric machine, a support gear which is coaxially arranged relative to the input gear in a rotatable manner and which is connected to the support element of the interlocking clutch in a rotationally fixed manner, wherein the support gear in the closed position of the interlocking clutch is supported on the stationary component against rotation, and in an open position of the interlocking clutch is freely rotatable, a plurality of planetary gears in meshing engagement with the input gear and the support gear, and a carrier element on which the planetary gears are rotatably supported and which is rotatably drivable about the axis of rotation to transmit torque to a downstream drive unit, wherein the friction clutch is arranged in the power path between one of the input gear, support gear and carrier element and another of the input gear, support gear and carrier element.

It is provided that in the closed position of the interlocking clutch and open position of the friction clutch, a first transmission ratio is formed between the drive gear and the carrier element, and that in the open position of the interlocking clutch, a variable torque can be transmitted between the drive gear and the carrier element by the friction clutch, wherein a second transmission ratio is formed between the drive gear and the carrier element when the friction clutch is fully closed.

The carrier element of the epicyclic gearing can be drivingly connected to a downstream power distribution unit, which can be configured in form of a differential gearing, for example. The differential gearing distributes the rotary motion introduced, to two output parts for driving a respective side shaft. Instead of a differential gearing, a dual clutch unit can also be used as power distribution unit (twin clutch).

BRIEF SUMMARY OF THE DRAWINGS

Example embodiments are explained below with reference to the drawing figures. Herein:

FIG. 1A shows a longitudinal section of an actuator assembly for a clutch arrangement in the driveline of a motor vehicle in a first embodiment;

FIG. 1B shows the actuator assembly from FIG. 1A according to section line 1B-1B;

FIG. 1C a detail of the actuator assembly of FIG. 1B in enlarged view;

FIG. 4A shows an actuator assembly for a clutch arrangement in the driveline of a motor vehicle in a second embodiment in a longitudinal section;

FIG. 4B shows the actuator assembly of FIG. 4A according to section line 4B-4B;

FIG. 5A shows an actuator assembly for a clutch arrangement in the driveline of a motor vehicle in a further embodiment in a longitudinal section; and FIG. 5B shows the actuator assembly of FIG. 5A according to section line 5B-5B.

DESCRIPTION

Figure 2A:
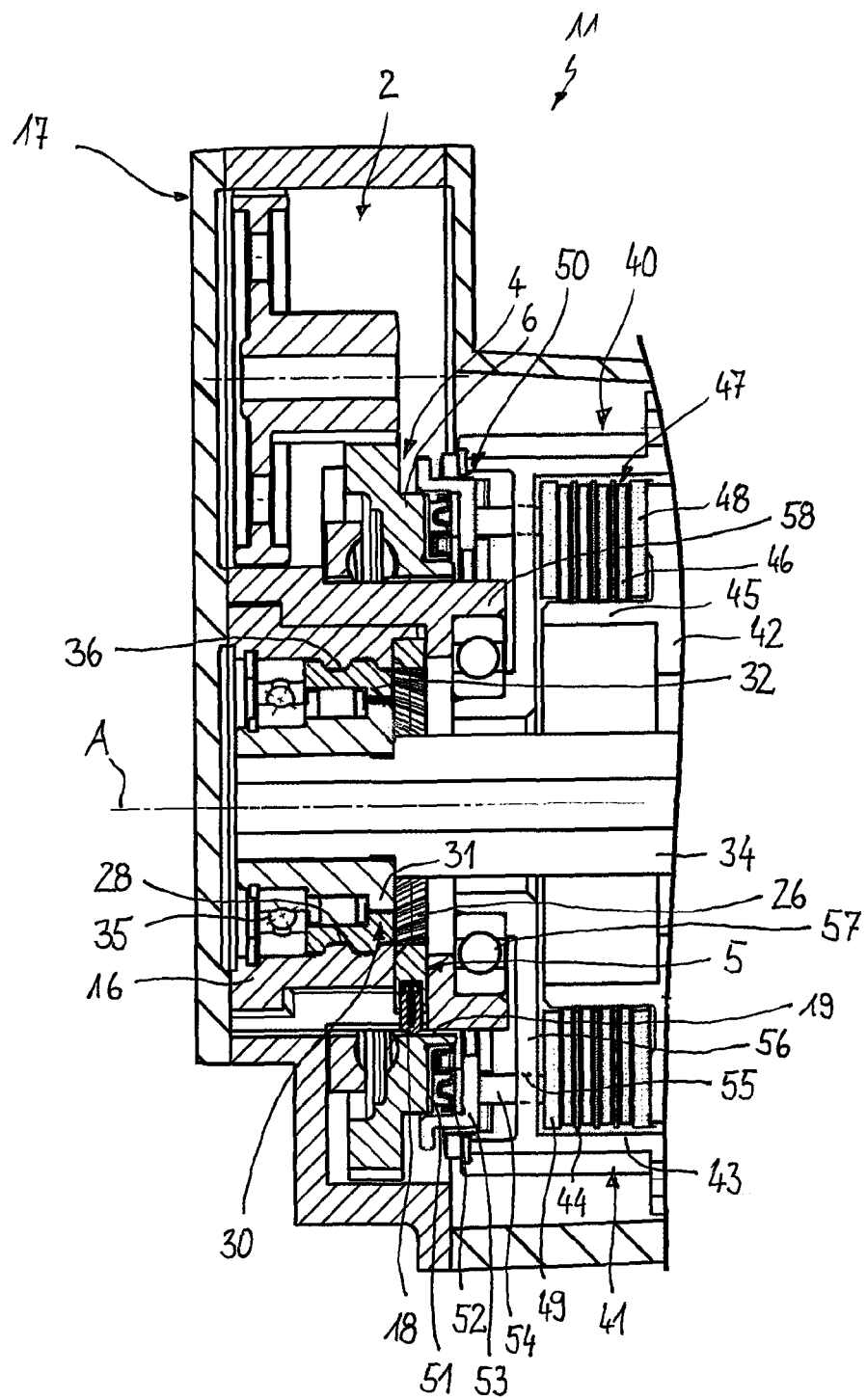
FIG. 2A a clutch arrangement with a locking clutch and a friction clutch as well as with an actuator assembly as shown in FIGS. 1A and 1B in a longitudinal section.
Figure 2B:
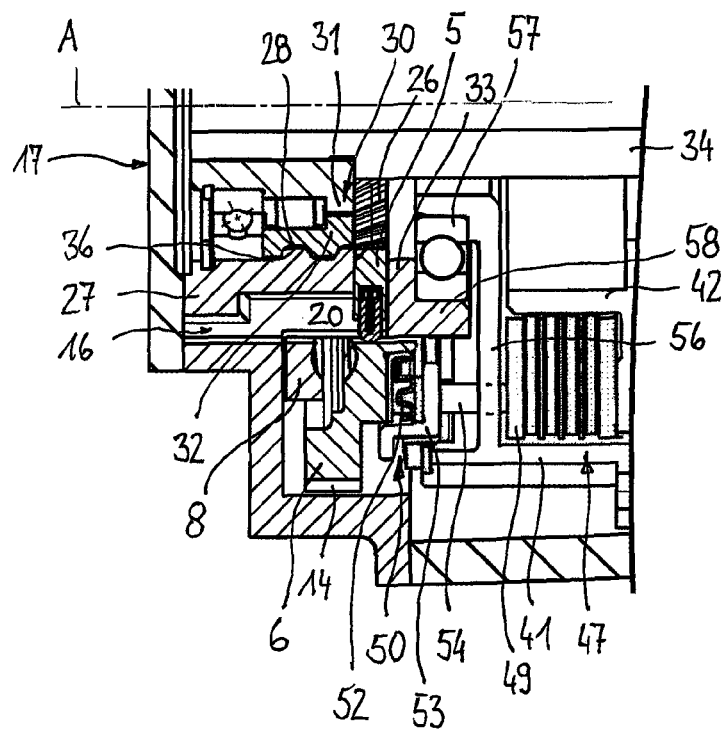
FIG. 2B shows a half-longitudinal section of the clutch arrangement shown in FIG. 2A with the interlocking clutch closed.
Figure 2C:
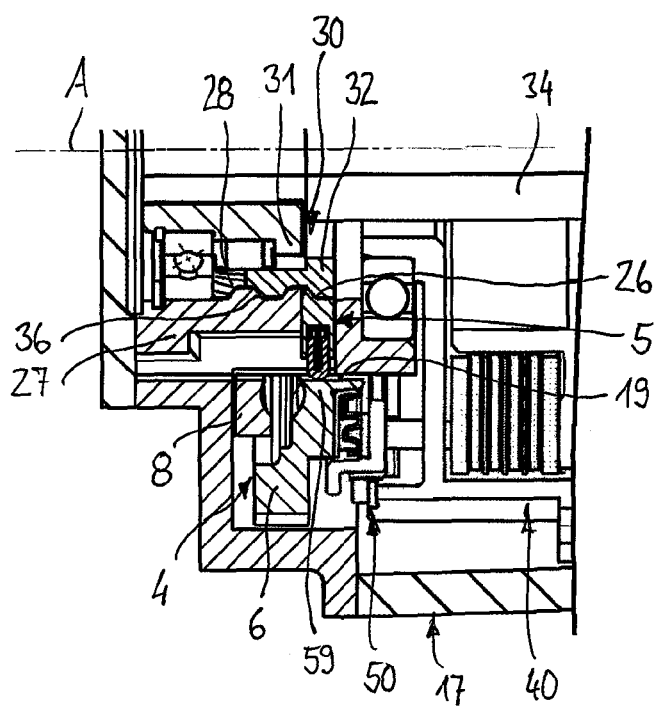
FIG. 2C shows the clutch arrangement of FIG. 2A in a half-longitudinal section with the interlocking clutch open.
Figure 3:
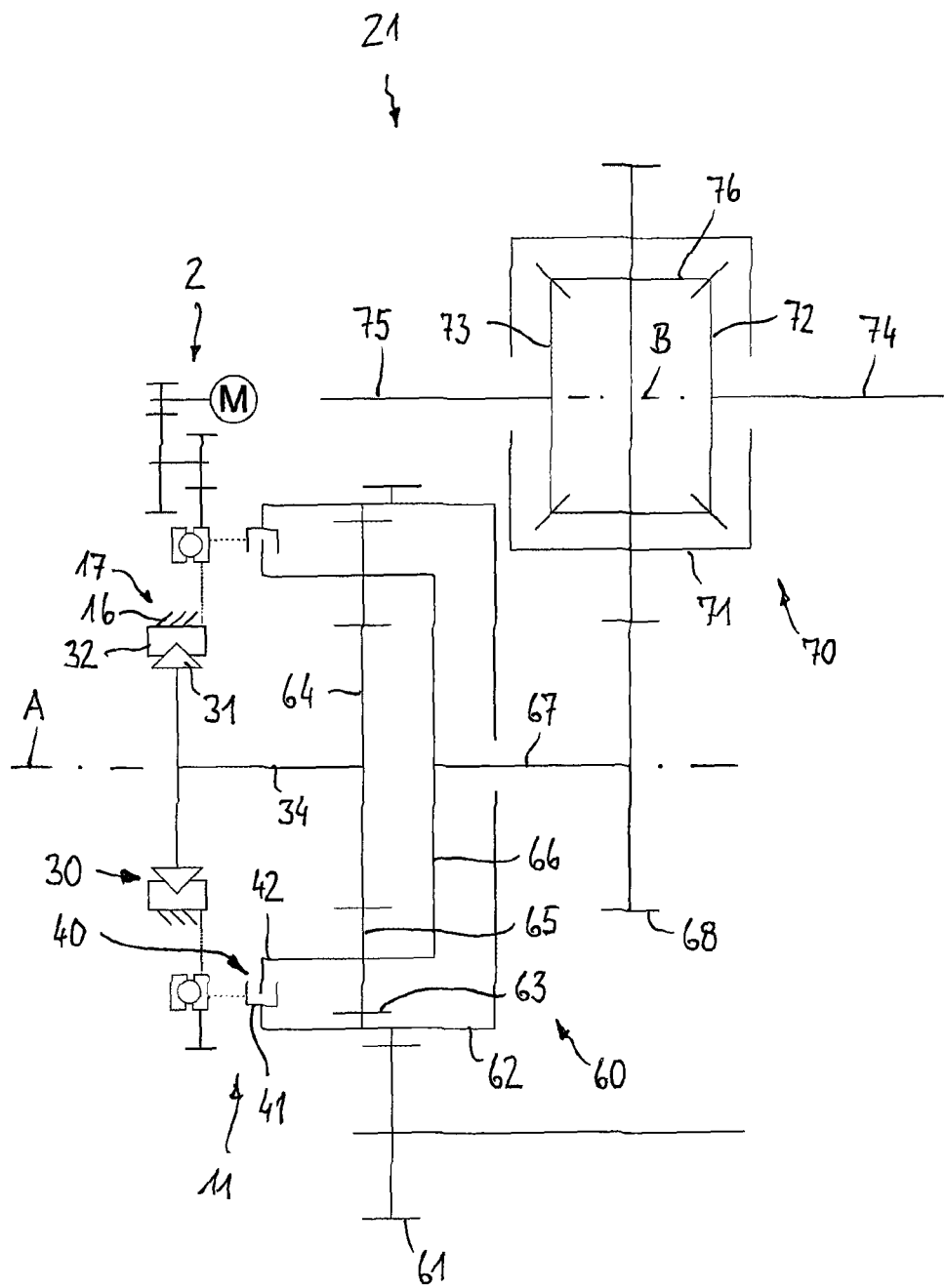
FIG. 3 shows schematically a drive arrangement with an actuator assembly as shown in FIG. 1.

FIGS. 1 to 3 are described together below. An actuator assembly 2 according to the disclosure for actuating clutches in the driveline of a motor vehicle is shown. The actuator assembly 2 comprises a drive gear 3 drivable by an actuator drive unit (not shown), a ramp ring arrangement 4 configured to convert a rotary motion introduced by the drive gear 3 into an axial motion, and a locking ring 5 indirectly drivingly connected to the drive gear 3 to be rotated by same about the axis of rotation A.

The ramp ring arrangement 4 is in the present example designed in the form of a ball ramp unit comprising a first ramp ring 6 with a plurality of circumferentially distributed first ball tracks 7, a second ramp ring 8 with a plurality of circumferentially distributed second ball tracks 9, and a plurality of circumferentially distributed balls arranged respectively between a first ball track 7 and a second ball track 9 and guided therein. The balls are located outside the sectional plane shown and are therefore not visible.

The actuator drive gear 3 is drivingly connected to the first ramp ring 6 in order to rotate the latter about the axis of rotation A. For this purpose, the drive gear 3 has a first toothing 12 for introducing a rotational movement from a drive source, and a second toothing 1, which engages with a counter toothing 14 of the first ramp ring 6.

The second ramp ring 8 is axially supported against a stationary component 16 and held in a rotationally fixed manner. The stationary component 16 is configured in the present example, as a sleeve-shaped portion of a housing 17. A relative rotational movement of the first ramp ring 6 with respect to the rotationally fixed second ramp ring 8 causes the balls to run in the ball grooves 7, 9 in the circumferential direction, wherein—when the balls run in flatter portions of the ball grooves 7, 9—the first ramp ring 6 is moved axially away from the second ramp ring 8.

The locking ring 5 has a plurality of circumferentially distributed connecting elements 18 that are in frictional contact with an inner circumferential face 19 of an actuating ring 59 of the first ramp ring 6. In the present embodiment, the actuating ring 59 is formed with the ramp ring 6. Exactly three connecting elements 18 distributed regularly over the circumference are provided in the present example, wherein a different number also being possible. The connecting elements 18 extend radially outwardly through circumferentially distributed openings 20 of the stationary component 16. The openings 20 have a circumferential extension $\alpha 20$ which is greater than a circumferential extension $\alpha 22$ of the connecting elements 18 and/or of the supporting elements 22 in which the connecting elements 18 are accommodated, so that the locking ring 5 can be rotated to a limited extent relative to the stationary component 16. In this case, the side walls 23, 24 of the openings 20 form rotation stops against which the supporting elements 22 can be supported in the circumferential direction. It can be seen, in particular in the lower half section of FIG. 1A, that the openings 20 are in the present example configured in the form of slots which extend from a free end 29 of the sleeve-shaped housing part 16 to an axial stop 33 against which the locking ring 5 is axially supported.

In the present embodiment, the connecting elements 18 are each resiliently supported in the radial direction against the respective support element 22 via a spring element 25. The spring bias brings the connecting elements 18 into frictional contact with the inner face 19 of the first ring 6, so that they rotate along with the first ring 6 as it rotates until they come into contact against one or other of the rotation stops 23, 24, depending on the direction of rotation. After reaching the rotation stop, the first ring 6 continues to rotate, but the setting ring 5 remains in its rotational position and the connecting elements 18 slide along the inner face 19 of the first ring 6.

The locking ring 5 further has a ring portion 15 with an inner toothing 26. Axially adjacent to the locking ring, provided is a second sleeve-shaped housing part 27 connected to the sleeve-shaped housing part 16. The second sleeve-shaped housing part 27 has a second inner toothing 28, which is shaped in the same way as the inner toothing 26 of the locking ring 5.

By rotating the ramp ring 6, the locking ring 5 is co-rotated via the connecting elements 18 for a limited rotational travel. Herein, the locking ring 5 is moved from a first rotational position Pr1, in which its inner toothing 26 is offset in the circumferential direction relative to the inner toothing 28 of the housing part 27 (tooth-on-gap position), to a second rotational position Pr2, in which the two inner toothing 26, 28 are aligned with each other (tooth-on-tooth position). In the first rotational position Pr1, at least some of the teeth of the locking ring 5 lie in circumferential regions of tooth gaps of the housing part 27, so that an axial movement of a component 32 meshingly engaging with the housing part 27 is blocked by the locking ring 5. In the second rotational position Pr2, the toothing 26 of the locking ring 5 forms a natural continuation of the toothing 28 of the housing part 27, so that the component 32, which engages with its corresponding outer toothing in the inner toothing 28 of the housing part 27, can now be displaced axially into the inner toothing 26 of the locking ring 5.

The ball ramp arrangement 4 is configured such that the setting ring 6, in case of relative rotation with respect to the supporting ring 8 in the direction R1 as far as the locking ring 5 reaching its end stop 24 (second rotational position Pr2), maintains its axial position Pa1. Only after the locking ring 5 has assumed its second rotational position Pr2 and the component 32 engages in the toothing 26 of the locking ring 5 do the balls of the ball ramp arrangement 4 move into flatter areas so that the locking ring 5 is moved axially away from the support ring 8 in a direction of a second axial position Pa2.

In this way, the actuator assembly 2 can realize two functions, namely the actuation of the locking ring 5 to selectively block or release an axial movement of the component 32, and the actuation of a further setting member 49 by means of the axially movable setting ring 6.

FIGS. 2A to 2C show a clutch arrangement 11 with an actuator assembly 2 as in FIG. 1. The clutch arrangement 11 comprises a first clutch 30, which is configured in the form of an interlocking clutch, and a second clutch 40, which is configured in the form of a friction clutch.

The interlocking clutch 30 comprises a first clutch part 31, which is connected to a shaft 34 in a rotationally fixed manner, and the component 32 as a second clutch part. The first clutch part is axially supported with an end portion against a shaft shoulder of the shaft 34. The shaft 34 with the first clutch part 31 mounted thereon, is rotatably mounted and axially supported with respect to the axis of rotation A by means of a bearing 35 in the housing part 16. A bearing inner ring of the bearing 35 is axially supported between a shoulder of the clutch part 31 and an axial retaining ring. The bearing outer ring is received in the housing part 16 and axially supported by means of a further axial retaining ring. The second clutch part 32 has an outer toothing 36 which is in meshing engagement with the inner toothing 28 of the housing part 16 for transmitting, receptively supporting a torque, wherein the second clutch part 32 is axially movable relative to the housing part 16.

FIG. 2B shows the interlocking clutch 30 in the closed position, in which the first clutch part 31 and the second clutch part 32 are in form-locking engagement with each other. In this condition, the shaft 34 is supported on the housing part 16 in the direction of rotation via the first clutch part 31 and the second clutch part 32, which is in engagement therewith.

To open the clutch 31 the locking ring 5, as described above, is moved by turning the ramp ring 6 from the first rotary position Pr1, in which the locking ring inner toothing 26 is offset in rotational direction relative to the housing inner toothing 28, to the second rotary position Pr2, in which the two inner toothings 26, 28 are aligned with each other. In this way, the axial blocking of the clutch part 32 is set aside, which clutch part can then be axially moved beyond the axial end of the housing inner toothing 28 into the locking ring 5.

The axial force for moving the clutch part 32 is effected in that the inner toothing 28 of the housing part 16 and, correspondingly, the outer toothing 36 are configured as helical toothings. The helical toothings are configured in such a way that a torque introduced into the shaft 34 and accordingly effective between the first clutch part 31 and the second clutch part 32 causes an axial movement of the second clutch part 32 in the opening direction.

Due to the axial movement, the clutch part 32 with its outer toothing 36 comes into engagement with the inner toothing 26 of the locking ring 5. Furthermore, the second clutch part 32 is disengaged from the first clutch part 31 so that the first clutch part 31 and the shaft 34 connected thereto can rotate freely relative to the second clutch part 32 and the housing part 16, respectively. The open position of the interlocking clutch 30 is shown in FIG. 2C, in which it can be seen that the second clutch part 32 is axially displaced relative to the first clutch part 31 and the form-locking engagement means are disengaged accordingly.

The second clutch 40 is configured as a friction clutch comprising a first clutch part 41 and a second clutch part 42 that is connectable thereto for a variable torque transmission. The first clutch part 41 forms a first disk carrier 43, to which first disks 44 are connected in a rotationally fixed and axially movable manner. The second clutch part 42 forms a second disk carrier 45, to which second disks 46 are connected in an axially movable and rotationally fixed manner. The first and second disks 44, 46, which can also be referred to as outer disks and inner disks, are arranged axially alternately and jointly form a disk pack 47. The disk pack 47 is axially supported in a first axial direction on the second clutch part 42 via support plate 48. To apply pressure to the disk pack 47, a pressure plate 49 is provided, which can be moved axially by the ball ramp arrangement 4.

For this, a force transmission mechanism 50 is provided between the first ramp ring 6 and the pressure plate 49, which transmits an axial movement of the first ramp ring 6 to the pressure plate 49 so that the disk pack 47 is loaded in the closing direction of the clutch 40. The force transmission mechanism 50 includes a support member 51 axially supported against an end face of the ramp ring 6, an axial bearing 52 for rotationally decoupling a relative rotational movement of the first clutch member 41 with respect to the ramp ring 6, an intermediate element 53 axially supported against and rotatable with respect to the axial bearing 52, and a plurality of circumferentially distributed pressure elements 54 connected to and axially moved together with the intermediate element 53. The pressure elements 54 extend into the first clutch part 41 through circumferentially distributed openings 55 (shown in dashed lines) in a side wall 56 thereof and are in contact with the pressure plate 49 to load same in the direction of the disk pack 47. The first clutch part 41 is rotatably mounted about the axis of rotation A in a bearing portion 58 of the housing part 16 by a bearing 57.

As described above, the ball ramp arrangement 4 is configured in such a way that after the setting ring 6 has assumed its second rotational position Pc2 and the interlocking clutch 30 has opened, the balls run into flatter areas. This moves the setting ring 6 axially away from the support ring 8 in the direction of the friction clutch 40 to close it. By controlling the actuator drive accordingly, the rotational position of the ramp ring 6 and thus the torque to be transmitted by the friction clutch 40 can be variably adjusted as required. To reopen the clutch 40 when the actuator is switched off, one or more return springs can be provided which cause the pressure plate 49 to move in the direction of the ball ramp arrangement 4. The return spring (not shown) can, for example, be arranged between the intermediate element 52 and the clutch wall 56.

FIG. 3 shows a drive arrangement 21 according to the disclosure with a clutch arrangement 11 according to the disclosure as shown in FIGS. 2A to 2C, respectively with an actuator assembly 2 according to the disclosure as shown in FIG. 1, in schematic representation. The structure and mode of operation of the actuator assembly 2 and the clutch arrangement 11 according to FIG. 3 correspond to the embodiments according to FIGS. 1 and 2, so that in this respect reference is made to the above description by way of abbreviation. The same or corresponding components are provided with the same reference signs as in the above figures.

The drive arrangement 21 includes a gear unit 60 and a power distribution unit 70 downstream thereof in the power path.

The gear unit 60 comprises two transmission stages with different transmission ratios. For this, the gear unit 60 comprises an epicyclic gearing unit with a rotatably drivable input part 62 with a ring gear 63 as input gear, a support gear 64 arranged coaxially thereto, a plurality of planetary gears 65 which are in meshing engagement with the ring gear 63 and the support gear 64, and a carrier element 66 on which the planetary gears 65 are rotatably supported.

The input part 62 has an outer toothing that engages with a drive gear 61 of a drive shaft to transmit rotary motion. The drive shaft is rotationally driven by an electric machine (not shown). The drive gear 61 and the input part 62 are effective as a reduction gearing that translates a rotational motion from high speed to reduced speed. Thus, input part 62 rotates with slower speed than the drive shaft. The gearing input part 62 is fixedly connected to the first clutch part 41, so that both rotate together about the axis of rotation A. The planetary carrier 66 is fixed to the second clutch part 42 so that they rotate together about the axis of rotation A. By operating the friction clutch 40 in the closing direction, the speed of the carrier element 66 is adapted to the speed of the input part 62.

The support gear 64, which is arranged coaxially to the ring gear 63, is connected to the shaft 34 and thus to the first clutch part 31 of the interlocking clutch 30 in a rotationally fixed manner. Thus, in the closed position of the interlocking clutch 30, the support gear 64 is supported against the stationary component 16 in the direction of rotation, and can rotate freely in the open position of the interlocking clutch 30.

The planetary gears 65 are rotatably mounted on the planet carrier 44 and mesh with the ring gear 63 and with the support gear 64. The toothings of the planetary gears 65 with the ring gear 63 and with the support gear 64 are preferably designed as helical toothings. The planet carrier 66 is fixedly connected to an output part 67 of the gearing 60.

In the closed position of the interlocking clutch 30 and open position of the friction clutch 40, a first transmission ratio is provided between the input part 62 and the carrier element 66. The support gear 64 is connected to the housing 17 in a rotationally fixed manner via the interlocking clutch 30, while the second friction clutch 40 disconnects the ring gear 63 from the support gear 64. The rotary motion of the ring gear 63 is thus transmitted to the planet carrier 66 via the planetary gears 65 rotating around the support gear 64. The planetary gearing 60 acts as a reduction gearing that translates a rotary motion from high speed to slow speed. Thus, the planet carrier 66 rotates slower than the ring gear 63, wherein a first transmission ratio i1 is provided.

For the second transmission stage, the interlocking clutch 30 disconnects the support gear 64 from the housing 17, while the friction clutch 40 transmits torque from the input part 62 to the carrier element 66. In this way, the planetary gearing is increasingly locked with increasing degree of closing of the clutch 40. With the support gear 64 free to rotate, the rotary motion of the ring gear 63 is thus transmitted via the planetary gears 65, which cannot rotate around the support gear 64, to the planet carrier 66. When the friction clutch 40 is completely closed, the rotational speeds of the input part 62 respectively ring gear 63 on the one hand and the planet carrier 66 respectively output part 67 on the other hand are identical. A second transmission ratio is thus provided, which is different from the first transmission ratio. Since the second clutch 40 is configured as a friction clutch, the torque and speed can be variably adjusted according to the requirement.

The output part 67 of the planetary gearing drives an input part 71 of the power distribution unit 70 via a drive gear 68. The power distribution unit 70 is designed in the present example in the form of a differential gearing which distributes an introduced rotary motion to two output parts 72, 73 for driving a respective side shaft 74, 75. The input part 71 is configured in the form of a differential cage rotatable about the axis of rotation B, in which a plurality of differential gears 76 are rotatably supported, which mesh with the two output gears 72, 73.

FIGS. 4A and 4B show an actuator assembly 2 in a second embodiment, which largely corresponds to the embodiment according to FIGS. 1A to 1C, so that reference is made to the above description with regard to the shared features. In this context, the same and/or corresponding details are provided with the same reference signs.

A difference in the present embodiment according to FIGS. 4A and 4B is that the locking ring 5 is not actuated, i.e., rotated, by the rotationally drivable ramp ring 6, but by the axially supported ramp ring 8.

In this example, it is provided that the locking element 5 is connected to the second ramp ring 8 in a rotationally fixed manner via the connecting elements 18, so that both rotate jointly about the axis of rotation A. In this case, the friction face pairing is formed in the power path between the rotationally drivable first ramp ring 6 and the second ramp ring 8. When the first ramp ring 6 is rotated by the drive gear 3, the second ramp ring 8 and the locking ring 5 rotationally fixedly connected therewith, initially also co-rotate until the locking ring 5 abuts against a rotation stop 23, 24 of the stationary housing 16. In this first rotational setting range, the second ramp ring 8 is carried along by means of frictional forces acting between the first ramp ring 6 and the balls, respectively the balls and the second ramp ring 6. After the locking ring 5 and the second ramp ring 8 connected thereto come to a rotational stop, the first ramp ring 6 continues to rotate relative to them. As it does so, the balls in the ball grooves 7, 9 roll in the direction of flatter portions so that the first ramp ring 6 is pushed axially away from the second ramp ring 8.

In this embodiment, the connecting elements 18 are configured in one piece with the ring portion 15, which form-lockingly engage with corresponding recesses 37 of the ramp ring 8 so that both are connected to each other in a rotationally fixed manner.

FIGS. 5A and 5B show an actuator assembly 2 in a further embodiment, which largely corresponds to the embodiment according to FIGS. 1A to 1C. In this respect, reference is made to the above description with regard to the shared features, whereby the same or corresponding details are provided with the same reference signs as in FIGS. 1A to 1C.

A difference in the present embodiment according to FIGS. 5A and 5B is that the actuating ring 59 for rotating the locking ring 5 is not formed on the rotatably drivable ramp ring, but is configured in the form of a separate intermediate ring. The intermediate ring 59, which can also be referred to as an intermediate gear, engages the first toothing 12 of the drive gear 3 and is rotationally driven thereby. The two toothings 12, 13 of the drive gear 3 have a different diameter and/or a different number of teeth, so that the first gear pair (12, 58) has a different transmission ratio than the second gear pair (13, 14).

The intermediate gear 59 is mounted with an inner circumferential face on a bearing seat 58 of the sleeve-shaped housing part 16 so as to be rotatable about the axis of rotation A. By rotating the drive gear 3, the intermediate gear 59 is rotationally driven accordingly, with which the locking ring 5 is in contact via friction face pairings. In this case, the friction face pairing is formed between the contact faces of the connecting elements 18 and an inner circumferential face 19 of the intermediate gear 38.

The spring preload brings the connecting elements 18 into frictional contact with the inner face 19 of the intermediate gear 59 so that as the intermediate gear 59 rotates, they jointly rotate therewith, until they come to rest against one or other of the rotation stops 23, 24, depending on the direction of rotation. After reaching the respective rotation stop, the intermediate gear 59 continues to rotate, wherein however, the locking ring 5 remains in its rotational position and the connecting elements 18 slide along the inner face 19 of the intermediate gear.

When the locking ring 5 is rotated to the second rotational position Pr2, the two inner toothings 26, 28 of the toothed housing part 27 and the locking ring 5 are aligned with each other so that a component in toothed engagement with the housing part 27 can move axially into the locking ring 5 to actuate, for example, a locking clutch.

The ball ramp arrangement 4 is configured substantially as in the above embodiments. By rotating the first ramp ring 6 relative to the second ramp ring 8, the balls move to flatter areas so that the first ramp ring 6 is moved axially away from the second ramp ring 8, for example to actuate a friction clutch.

LIST OF REFERENCE SIGNS 2 actuator assembly
3 drive gear
4 ramp ring arrangement
5 drive gear
6 first ramp ring
7 first ball track
8 second ramp ring
9 second ball track
10 balls
11 clutch arrangement
12 first toothing
13 second toothing
14 toothing (6)
15 ring portion
16 stationary component
17 housing
18 connecting elements
19 inner circumferential face
20 opening
21 drive arrangement
22 support element
23 rotary stop
24 rotary stop
25 spring element
26 inner toothing (5)
27 housing part
28 inner toothing (27)
29 end (16)
30 first clutch
31 first clutch part
32 second clutch part/component
33 axial stop
34 shaft
35 bearing
36 outer toothing
37 recess
38 intermediate gear
39 actuating face
40 second clutch
41 first clutch part
42 second clutch part
43 first disk carrier
44 first disks
45 second disk carrier
46 second disks
47 disk pack
48 support plate
49 pressure plate
50 power transmission mechanism
51 support member
52 axial bearing
53 intermediate element
54 pressure element
55 opening
56 side wall
57 bearing
58 bearing seat
59 actuating ring
60 transmission
61 drive gear
62 input part
63 ring gear
64 support gear
65 planetary gear
66 planet carrier
67 output part
68
69
70 power distribution unit
71 input part
72 output part
73 output part
74 side shaft
75 side shaft
76 differential gear
A axis
α angle
Pa axial position
Pr rotational position
R direction

The invention claimed is:

1. Actuator assembly for a clutch arrangement in a driveline of a motor vehicle, comprising:
a rotatably drivable drive gear;
a locking ring mounted in a stationary housing so as to be rotatable about an axis of rotation and drivingly connected to the drive gear via a power path;
wherein the locking ring is rotatable by the drive gear from a first rotational position into a second rotational position against a rotation stop; and wherein at least one friction face pairing is provided in the power path between the drive gear and the locking ring, via which torque is transmittable to the locking ring by means of frictional forces;
a first ramp ring that is rotatably drivable by the drive gear; and
a second ramp ring;
wherein the first ramp ring and the second ramp ring, which are arranged in the power path between the drive gear and the locking ring, are axially supported against each other and are configured to convert a relative rotary movement into an axial movement;
wherein the first ramp ring, after the locking ring has reached the rotation stop, is further rotatably drivable by the drive gear.

2. The actuator assembly according to claim 1,
wherein the locking ring has a ring portion and at least one connecting element projecting therefrom to provide torque into the locking ring.

3. The actuator assembly according to claim 2,
wherein the stationary housing has a sleeve-shaped portion in which the locking ring is supported so as to be rotatable to a limited extent, wherein the sleeve-shaped portion comprises at least one radial through-opening into which the at least one connecting element of the locking ring engages.

4. The actuator assembly according to claim 2,
wherein the at least one connecting element of the locking ring is rotatable by an actuating ring arranged in the power path between the drive gear and the locking ring.

5. The actuator assembly according to claim 4,
wherein the locking ring has at least one spring element to resiliently preload the at least one connecting element, wherein the at least one connecting element is resiliently loaded by the at least one spring element against the actuating ring and is in frictional contact therewith to form the at least one friction face pairing.

6. The actuator assembly according to claim 5,
wherein the actuating ring is connected in a rotationally fixed manner to the rotatably drivable first ramp ring, wherein the friction face pairing is formed between a contact face of the connecting element and a supporting face of the actuating ring.

7. The actuator assembly according to claim 5,
wherein the actuating ring is configured in the form of an intermediate gear which is rotatably drivable about the axis of rotation by the drive gear, wherein the friction face pairing is formed between a contact face of the connecting element and a supporting face of the intermediate gear.

8. The actuator assembly according to claim 7,
wherein the drive gear has a first toothing for driving the intermediate gear and a second toothing for driving the first ramp ring, wherein the first toothing and the second toothing have different diameters from one another.

9. The actuator assembly according to claim 4,
wherein the locking ring is connected to the second ramp ring in a rotationally fixed manner via the at least one connecting element, so that the locking ring and the second ramp ring rotate jointly, wherein the friction face pairing is formed in the power path between the rotatably drivable first ramp ring and the second ramp ring such that the second ramp ring is carried along with the first ramp ring and rotates therewith by frictional forces until the locking ring reaches the rotation stop, wherein when the locking ring abuts the rotation stop, the first ramp ring is rotatable relative to the second ramp ring, with the relative rotary movement being converted into the axial movement.

10. The actuator assembly according to claim 1,
wherein the first ramp ring and the second ramp ring are axially supported against each other indirectly via balls which run in respective ball grooves of the first ramp ring and the second ramp ring.

11. The actuator assembly according to claim 1,
wherein the second ramp ring is axially supported against the stationary housing, wherein the first ramp ring is movable by being rotatably driven by the drive gear from a first axial position, in which the first ramp ring is axially close to the second ramp ring, into a second axial position, in which the first ramp ring is axially spaced from the second ramp ring;
wherein the first ramp ring, on a side facing away from the second ramp ring, includes an actuating face for axially loading a friction clutch.

12. The actuator assembly according to claim 1, provided in a drive arrangement comprising
an interlocking clutch having a first clutch element and a second clutch element axially movable relative thereto, the second clutch element being connected in a rotationally fixed manner to the first clutch element in a closed position and being disconnected from the first clutch element in an open position in order to be freely rotatable relative thereto; and
a friction clutch for variable torque transmission between a first clutch part and a second clutch part;
wherein the locking ring of the actuator assembly in the first rotational position blocks an axial movement of the second clutch element of the interlocking clutch, wherein the interlocking clutch is closed;
wherein the locking ring, by being rotated into the second rotational position by the drive gear, releases the second clutch element of the interlocking clutch so that the interlocking clutch is opened;
wherein upon further rotation of the drive gear the locking ring remains in the second rotational position and the friction clutch is loaded by the rotatably drivable first ramp ring in a closing sense.

13. The actuator assembly according to claim 12,
wherein the friction clutch includes a disk pack between the first clutch part and the second clutch part;
wherein the disk pack is axially loadable by a pressure plate, which can be actuated by the first ramp ring, wherein an axial bearing is provided between the first ramp ring and the pressure plate for rotational decoupling.

14. The actuator assembly according to claim 12,
wherein an epicyclic gearing is provided including
an input gear which is rotatably drivable by the electric machine about an axis of rotation;
a support gear, which is coaxially arranged to the input gear in a rotatable manner and which is connected to the first clutch element of the interlocking clutch in a rotationally fixed manner, wherein the support gear in the closed position of the interlocking clutch is supported on the stationary component against rotation, and in an open position of the interlocking clutch is freely rotatable;
a plurality of planetary gears in meshing engagement with the input gear and the support gear; and a carrier element on which the planetary gears are rotatably mounted and which is rotatably drivable about the axis of rotation to transmit torque to a downstream drive unit;

wherein the friction clutch is arranged in the power path between one of the input gear, support gear, and carrier element and another one of the input gear, support gear, and carrier element.

15. The actuator assembly according to claim 12, wherein, in the closed position of the interlocking clutch and the open position of the friction clutch, a first transmission ratio is provided between the input gear and the carrier element, and wherein, in the open position of the interlocking clutch, a variable torque is transmittable between the input gear and the carrier element by the friction clutch, wherein when the friction clutch is fully closed, a second transmission ratio is provided between the input gear and the carrier element.

16. The actuator assembly according to claim 12, wherein the carrier element of the epicyclic gearing is drivingly connected to a downstream power distribution unit, which is configured in the form of a differential gearing.

* * * * *